Figure 1:
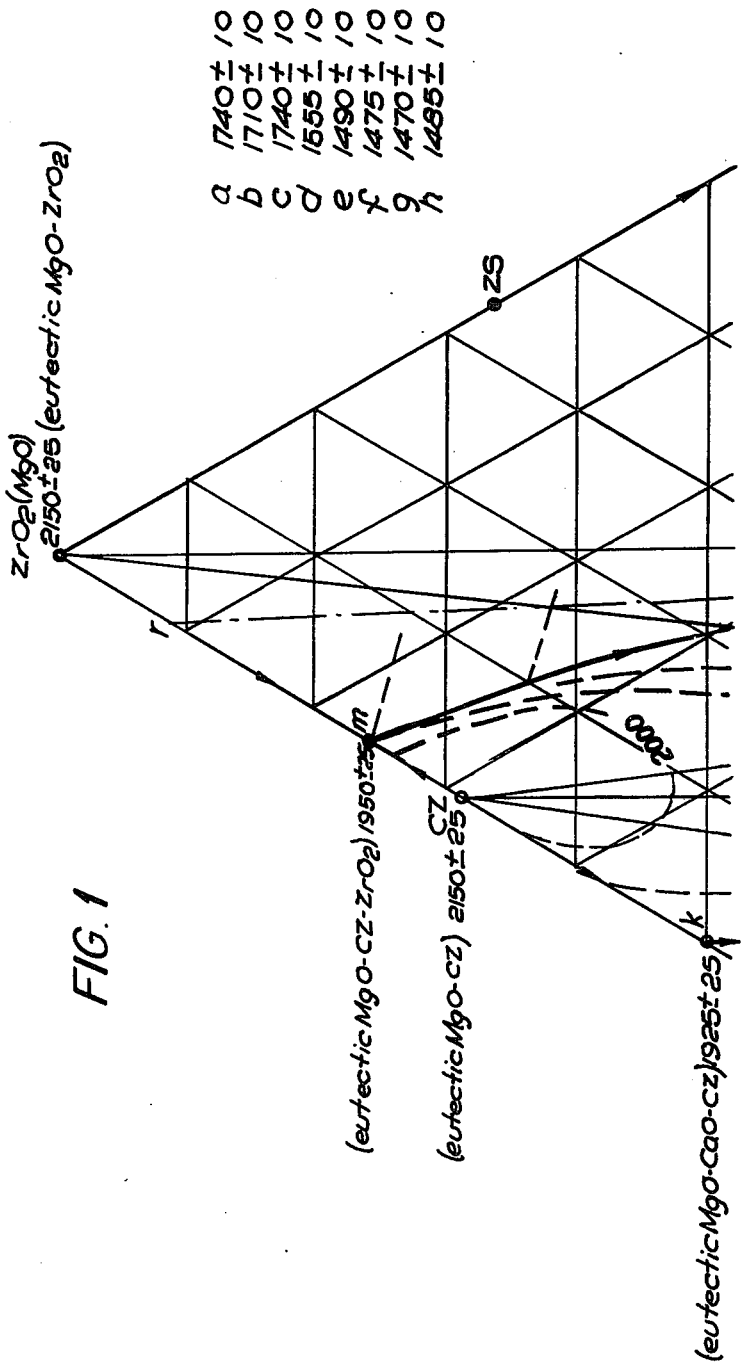

United States Patent [19]

de Aza et al.

[11] 4,010,039
[45] Mar. 1, 1977

[54] REFRACTORIES

[75] Inventors: Salvador de Aza, Madrid, Spain; Colin Richmond, Worksop; James White, Retford, both of England

[73] Assignee: Gr-Stein Refractories Limited, United Kingdom

[22] Filed: Nov. 8, 1974

[21] Appl. No.: 522,225

Related U.S. Application Data

[63] Continuation-in-part of Ser. No. 351,949, April 17, 1973, abandoned, which is a continuation-in-part of Ser. No. 98,272, Dec. 15, 1970, abandoned.

[30] Foreign Application Priority Data

Feb. 17, 1970  United Kingdom ............ 61383/70

[52] U.S. Cl. .................................. 106/57; 106/58; 106/63
[51] Int. Cl.² ......................................... C04B 35/48
[58] Field of Search ............................... 106/57, 58

[56] References Cited

UNITED STATES PATENTS 3,576,654   4/1971   Carini et al. ................. 106/57

Primary Examiner—J. Poer
Attorney, Agent, or Firm—Lowe, King, Price & Markva

[57] ABSTRACT

A solid-solid bonded basic refractory having a chemical composition (calculated as the oxides) consisting essentially of MgO in the amount 25% to 97% by weight, CaO 0.9% to 44% by weight, $ZrO_2$ 2% to 57% by weight, and $SiO_2$ 0.5% to 23.5% by weight, the said basic refractory containing a silicate and an alkaline earth metal zirconate, the $CaO/SiO_2$ ratio being greater than 1.4, there being at least one part by weight of said alkaline earth metal zirconate for each three parts by weight of said silicate, and the CaO to $SiO_2 + ZrO_2$ ratio being between 0.32 and 1.40, said alkaline earth metal zirconate being capable of co-existing with any basic solid refractory phase at a temperature of at least 1700° C in which solid-solid bonding is maintained between said zirconate and said solid refractory phase in the presence of a liquid phase at a temperature of at least 1700° C and in which said refractory forms a skeleton of said zirconate bonded to said refractory phase at a temperature of at least 1700° C.

8 Claims, 4 Drawing Figures

REFRACTORIES

This application is a continuation-in-part of Ser. No. 351,949, filed Apr. 17, 1973, now abandoned which was a continuation-in-part of parent application Ser. No. 98,272, filed Dec. 15, 1970, now abandoned.

This invention relates to basic refractories having a high degree of solid-solid bonding at high temperatures. By solid-solid bonding is meant the high degree of direct contact existing between the solid crystal grains of the refractory phases of high temperatures when a liquid phase has been formed within the refractory by the melting of the more fusible constituents.

The description below utilises chemical formulae to indicate the compositions of the different phases within a refractory composition. These formulae represent ideal compositions and it will be understood that in practice they may contain other oxides in solution.

In general it has been found that the liquid phase formed in refractories at high temperatures shows a high tendency to penetrate between the refractory grains so that the degree of solid-solid bonding tends to be low unless the content of fluxes is very low. This results in low hot strength and low resistance to attack by slags and fluxes in service and under certain conditions to spalling of the hot face of the refractory in service.

It has however been shown that the degree of solid-solid bonding in, e.g., magnesite refractories at high temperatures can be increased at constant liquid content by additions of chromic oxide or by increasing the $CaO/SiO_2$ ratio in the refractory. In both these cases it is believed that the effect is to alter the surface energies of the periclase-periclase-grain boundaries and the periclase-liquid phase boundaries in such a way that the equilibrium dihedral angle formed by the liquid phase at points of contact between the periclase grains is increased and the degree of penetration of the liquid between the periclase grains decreased.

It has further been found that an even greater increase in solid-solid contact at constant liquid content is frequently achieved when the composition is so controlled that a second solid phase coexists with periclase at high temperatures. It is believed that one condition for this effect of a second phase is that the energy of the interfaces between the unlike grains in the structure should be less than the energies of the grain boundaries between the like grains in the structure.

It has been shown that this effect is produced by the spinel phase in chrome-magnesite and magnesite-chrome refractories and by dicalcium silicate ($Ca_2SiO_4$) and forsterite ($Mg_2SiO_4$) in magnesite refractories. A limit to the effectiveness of these silicates in providing solid-solid bonding in magnesites for very high temperature service is however imposed by the temperatures at which they dissolve in the liquid phase. Thus the maximum temperature at which solid dicalcium silicate and solid forsterite can exist in contact with magnesia are 1800° C approximately and 1900° C, the melting temperatures of the MgO-dicalcium silicate eutectic and the MgO-forsterite eutectic respectively. Both temperatures are, however, lowered considerably when other components are present, e.g., iron oxides or, in the case of the MgO-forsterite eutectic, CaO.

The object of the invention is to provide an alternative means of promoting solid-solid bonding in basic refractory materials which bond is more extensive than hitherto known solid-solid bonding and which is stable to much higher temperatures than has hitherto been the case.

According to the present invention a solid-solid bonded basic refractory has a chemical composition (calculated as the oxides) consisting essentially of MgO in the amount 25% to 97% by weight, CaO 0.9% to 44% by weight, $ZrO_2$ 2% to 57% by weight, and $SiO_2$ 0.5% to 23.5% by weight, the said basic refractory containing a silicate and an alkaline earth metal zirconate, the $CaO/SiO_2$ ratio being greater than 1.4, there being at least one part by weight of said alkaline earth metal zirconate for each three parts by weight of said silicate, and the CaO to $SiO_2 + ZrO_2$ ratio being between 0.32 and 1.40, said alkaline earth metal zirconate being capable of coexisting with any basic solid refractory phase at a temperature of at least 1700° C in which solid-solid bonding is maintained between said zirconate and said solid refractory phase in the presence of a liquid phase at a temperature of at least 1700° C and in which said refractory forms a skeleton of said zirconate bonded to said refractory phase at a temperature of at least 1700° C.

The zirconate of an alkaline-earth metal may be added to the basic refractory as such or, alternatively, zirconia or zirconia-containing compounds and a compound containing an alkaline-earth metal may be added which, on firing, react to produce alkaline earth metal zirconate. Thus, the zirconate may be calcium zirconate and, alternatively, lime or lime-containing compounds added along with zirconia or zirconia-containing compounds which react on firing to produce calcium zirconate. The lime may be introduced as raw or burnt dolomite and the zirconia may be introduced as zircon.

Thus, according to a further feature of the invention, a solid-solid bonded basic refractory comprises calcium zirconate coexisting with solid periclase persisting at a high temperature while maintaining a high degree of solid-solid contact with the periclase in the presence of the liquid phase, to form a skeleton of zirconate-bonded periclase at high temperatures. Thus a solid-solid bonded basic refractory may have an initial composition MgO, 605 to 85% by weight; CaO, 7% to 14% by weight; $ZrO_2$, 6% to 18% by weight; $SiO_2$, less than 6% by weight, the refractory at temperatures in excess of 1700° C having periclase 65% to 82% by weight, calcium zirconate 3% to 19% by weight, and 15% by weight of a liquid phase, the refractory at 1700° C having a degree of solid-solid bonding represented by an Nss/N factor in excess of 0.17%, where Nss is the total points of contact between the solid phases and N the total points of contact between the solid phases plus the points of contact between the solid phases and the liquid phase.

TABLE 1

Solid-phase combinations (assemblages) of system CaO-MgO-$ZrO_2$-$SiO_2$ in which MgO (periclase) persists as a phase up to high temperatures (a)

| (1) | (3) | (5) | (7) | (9) | (11) |
|---|---|---|---|---|---|
| MgO | MgO | MgO | MgO | MgO | MgO |
| $ZrO_2$ | $ZrO_2$ | $ZrO_2$ | CZ | CZ | CZ |
| $M_2S$ | CMS | CZ | $C_3MS_2$ | $C_2S$ | $C_3S$ |
| CMS | $C_3MS_2$ | $C_3MS_2$ | $C_2S$ | $C_3S$ | CaO |

(b)

| (2) | (4) | (6) | (8) | (10) |
|---|---|---|---|---|
| MgO | MgO | MgO | MgO | MgO |

TABLE 1-continued

| ZrO$_2$ | ZrO$_2$ | CZ | CZ | CZ |
|---|---|---|---|---|
| CMS | C$_3$MS$_2$ | C$_3$MS$_2$ | C$_2$S | C$_3$S |

Notes: The following contractions are used - C = CaO, M = MgO, Z = ZrO$_2$, S = SiO$_2$.
(2) The table shows the ideal compositions of the phases. At high temperature, each of the four orthosilicate phases exist over a range of CaO/MgO ratios.

The invention will now be described in respect of a magnesia refractory in relation to the phase equilibrium relationship in the relevant part of the quaternary system CaO-MgO-ZrO$_2$-SiO$_2$ shown in FIG. 1 and FIG. 1A and in respect of the photo-micrographs shown in FIGS. 2 and 3 which are, respectively, a relatively conventional solid-solid bonded magnesia chrome brick, and a brick in accordance with the invention.

Table 1 shows (a) the six 4-phase combinations occurring in this system in the solid state which have periclase as a phase and (b) the five 3-phase combinations which correspond to tie triangles in the quaternary phase diagram separating the phase volumes of the six 4-phase combinations.

The composition ranges within which each of the 4-phase and 3-phase combinations occur are defined in molar terms by the phases coexisting within them. In computing the quantities of magnesite, dolomite, zircon or other raw materials required to give mixtures falling within any assemblage, allowance must, of course, be made for impurities present in these raw materials.

The influence of composition on melting behaviour and microstructure has also been investigated in the region of the system covered by the phase assemblages. This work has shown that in each of the phase assemblages the lowest temperatures of complete melting occur at high contents of the silicate phases. As a consequence, over a wide range of magnesia contents within each assemblage, periclase is the primary phase (i.e. the solid phase which coexists with the liquid phase at the highest temperatures). Within this range of magnesia contents compositions which fulfil the condition that bonding by solid calcium zirconate should persist above the temperature of initial melting are those in which, in addition to solid periclase, (i) solid calcium zirconate, or (ii) solid calcium zirconate and solid lime or (iii) solid calcium zirconate and solid ZrO$_2$ coexist with the liquid phase.

Figure 1A:
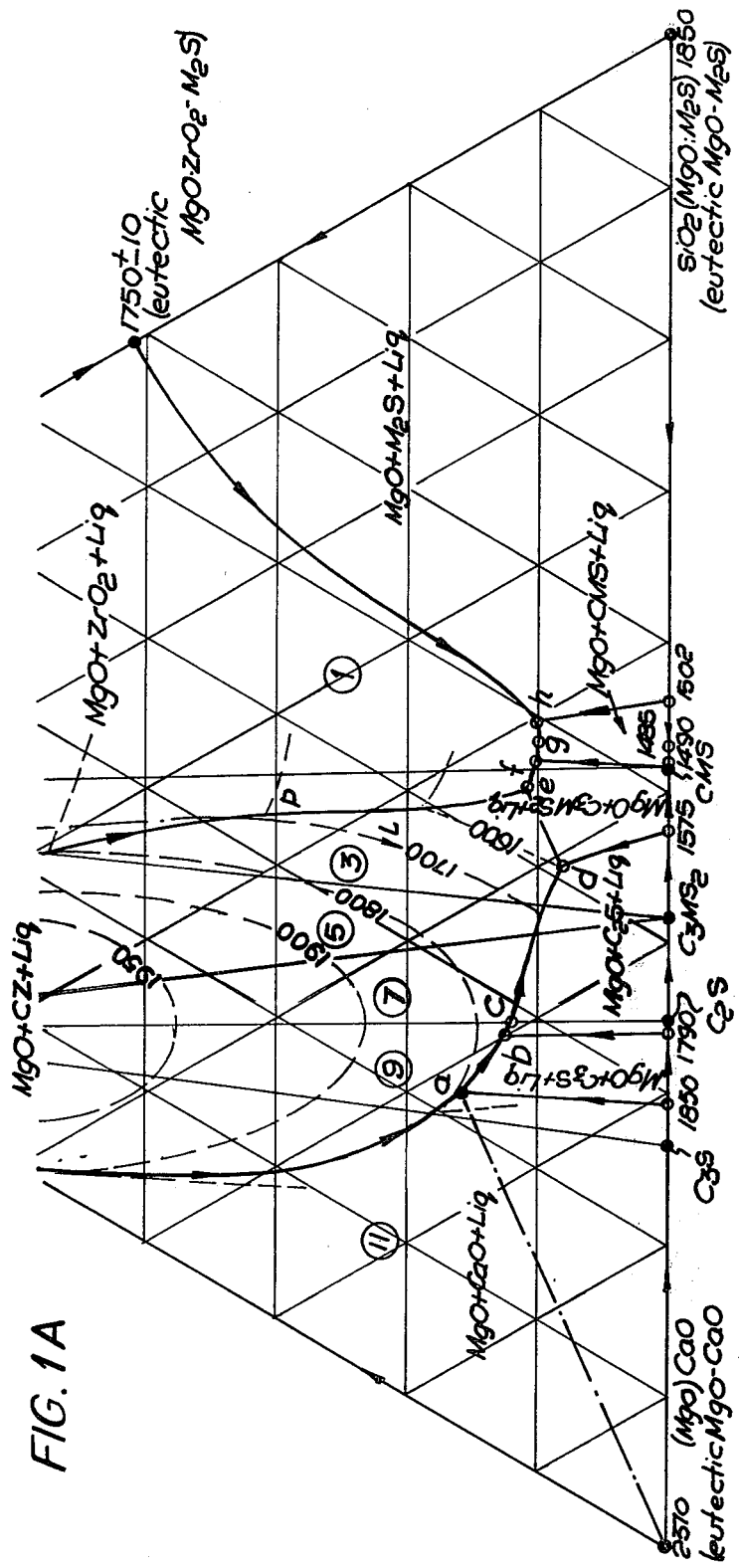

In FIG. 1 and 1A, condition (i) is satisfied by mixtures whose compositions, when expressed in terms of their CaO, ZrO$_2$ and SiO$_2$ contents, recalculated so that the total content of these oxides represents 100 parts, lie within the area k-a-b-c-d-e-m. Condition (ii) is satisfied by mixtures whose compositions, when similarly expressed, lie within the area CaO-a-k. Condition (iii) has been found to be satisfied by mixtures, whose compositions, when similarly expressed, lie within the area m-p-r. The point r represents the composition on the diagram of a ZrO$_2$—CaO—MgO solid solution which contains approximately 9% CaO and 3% MgO.

The composition triangle of FIGS. 1 and 1A is also divided by thin straight lines into areas which correspond to the six 4-phase assemblages of Table I. In the diagram, these areas are again defined in terms of the CaO, ZrO$_2$ and SiO$_2$ contents of the mixtures, expressed as already described. The six areas are numbered 1, 3, 5, 7, 9 and 11 to correspond with the numbering of the phase assemblages in Table I. The temperatures at which melting commences in compositions lying within these areas (phase assemblages) are respectively 1485° C, 1475° C, 1490° C, 1555° C, 1710° C, and 1740° C corresponding to the invariant points, h, f, e, d, b, a. The temperatures at which melting begins are thus lowest in these assemblages in which monticellite (CaO.MgO.SiO$_2$) or merwinite (3CaO.MgO.2SiO$_2$) or both of these silicates occur, i.e., the assemblages in which melting begins at h, f, e and d.

The highest temperatures of initial melting are thus formed in compositions to the left of the join C$_2$S-CA in the diagram, i.e., in assemblages (9) and (11). In mixtures within these assemblages, melting begins at points a and b respectively. Compositions containing merwinite and monticellite which fulfil the condition that bonding by solid calcium zirconate should persist within the melting range, are not, however, excluded from the patent since the presence of controlled amounts of melting at relatively low temperatures will enable firing to be carried out at lower temperatures.

Such control can be exerted by controlling the relative proportions of CaO, ZrO$_2$ and SiO$_2$ using the relationships indicated in FIGS. 1 and 1A and by control of the magnesia content of the mixture. In compositions in which periclase is the primary phase, i.e. the compositions whose melting behaviour is described by FIGS. 1 and 1A, increasing the magnesia content will not alter the temperature of initial melting, nor the temperature at which solution of calcium zirconate in the liquid phase is complete, but will decrease the quantity of liquid present at any temperature within the melting range and will increase the temperature of final melting.

On the other hand, in mixtures whose compositions, when expressed in terms of their CaO, ZrO$_2$ and SiO$_2$ contents, lie within the areas (i) k-a-b-c-d-e-m, (ii) CaO-a-k and (iii) m-p-r, the temperature at which solution of calcium zirconate in the liquid phase is complete increases with increasing ZrO$_2$ content at constant CaO/SiO$_2$ ratio in the mixtures. The magnitude of this effect is indicated by the isotherms in FIGS. 1 and 1A which are shown as dashed lines with the temperatures alongside. In compositions lying on these isotherms, solution of calcium zirconate in the liquid phase is complete at the indicated temperatures.

The effects of composition on melting behaviour are illustrated by the data in Table II, which relate to four compositions within phase assemblage (8) in which periclase, calcium zirconate and dicalcium silicate coexist in the solid state. In addition to the compositions of the four mixtures, the Table also gives their mineralogical constitutions in the solid state and the proportions of calcined dolomite, zircon, calcined magnesite and zirconia required to give these compositions on the assumption that these materials were all pure and of ideal chemical composition.

It has also been found that the effectiveness of calcium zirconate in providing a solid bond between the periclase grains is retained when the liquid phase contains appreciable B$_2$O$_3$ and that the solubility of calcium zirconate in such melts is low relative to that of the silicate phases. Solution of the refractory silicate phases in the melt is believed to be a cause of the low hot strength of sea-water magnesites which contain B$_2$O$_3$.

The improvement in solid-solid bonding that has been obtained in such compositions at temperatures at which a liquid phase is present is illustrated in Table III.

$N_{ss}/N$ is a parameter which measures the degree of solid-solid bonding and was determined from measurements on micrographs of polished sections of specimens which had been quenched from 1700° C. The compositions were selected so that at 1700° C, the liquid content of the mixtures and the composition of the liquid phase, would be 35.9% CaO, 19.1% $ZrO_2$ and 29.0% $SiO_2$ and would correspond to point L in FIGS. 1 and 1A.

Figure 2:
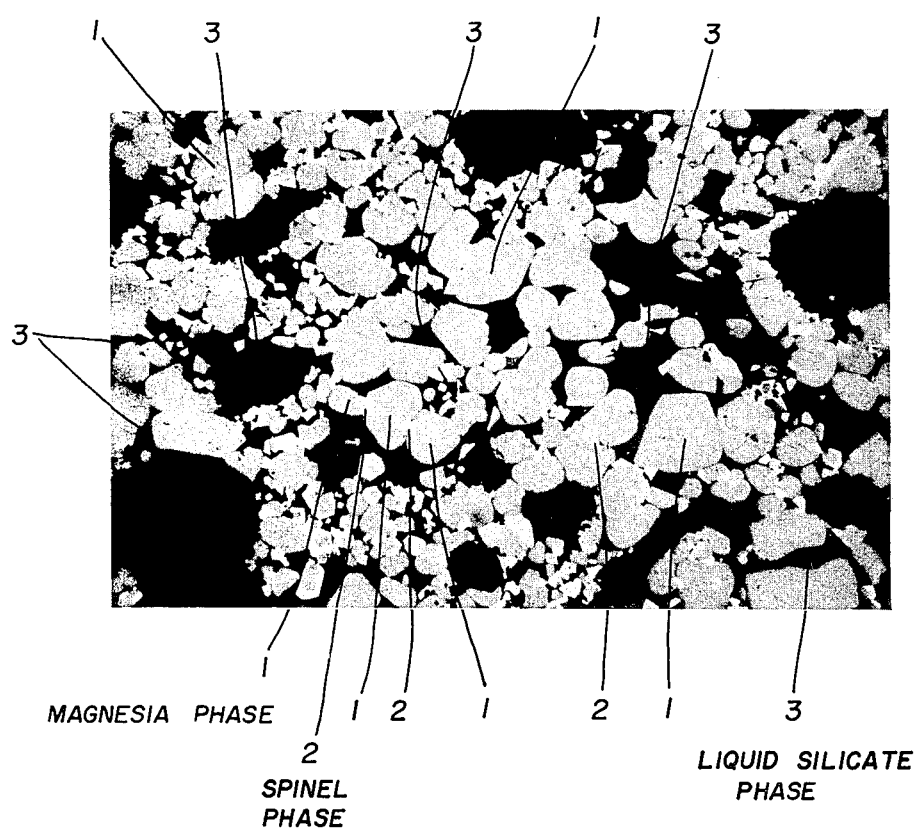
Figure 3:
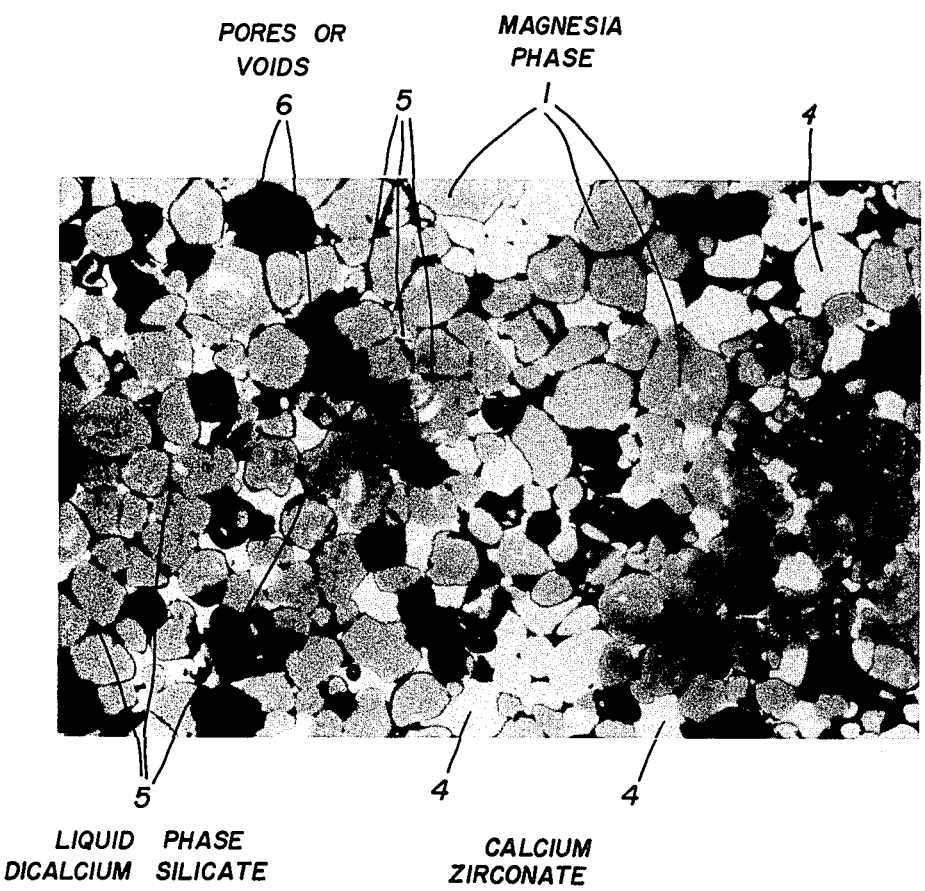

FIGS. 2 and 3 illustrate the improvement in solid-solid bonding that has been obtained in compositions according to the invention at temperatures at which a liquid phase is present. In FIG. 2, there is shown the matrix of a magnesia chrome brick, which matrix accounts for approximately 30% to 40% by volume of the whole brick, the remainder being constituted by coarse magnesia particles. The matrix itself is constituted by (by weight) 70% MgO, 4% $SiO_2$, 13% $Cr_2O_3$, 7% $Al_2O_3$ and 6% $Fe_2O_3$. The brick had been fired at 1700° C and then quenched rapidly to preserve the structure existing at 1700° C. On examination, the structure was clearly shown to have a magnesia/spinel/silicate bond the magnesia/spinel bond remaining at 1700° C but the silicate bond having disappeared by it having been reduced to a liquid. The magnesia grains 1 are seen in some instances to be directly attached to other magnesia grains and in other instances to spinel 2, the extent to which the silicate bond has participated in the overall bonding at temperatures up to 1500° C is shown by the large amounts of liquid phase 3, and having been converted to a liquid at 1700° C has resulted in a considerable reduction in overall strength at elevated temperatures.

In contrast to this FIG. 3 shows the matrix of a brick in accordance with the invention, the matrix comprising (by weight) 70% MgO, 4% $SiO_2$, 18% $ZrO_2$ and 8% CaO. The brick had been fired at 2000° C considerably higher than the brick of FIG. 2 and at a temperature which would have destroyed that bond by the elimination of spinel. At this temperature the spinel would have dissolved or would have diffused into the magnesia grains and would have led to total collapse of that brick. In FIG. 3, the magnesia grains 1 are shown in some instances attached directly to other magnesia grains and in other instances attached to grains of calcium zirconate 4. It will be noted that in other areas there is direct contact between grains of calcium zirconate. The only liquid phase shown in FIG. 3 in dicalcium silicate represented by the dark areas 5 around and between certain of the magnesia grains. The larger areas 6 are in fact pores or voids. It will therefore clearly be seen that there is a considerable reduction in the amount of liquid phase in the matrix and that the skeleton of solid-solid bonded magnesia and calcium zirconate is well capable of co-existing with that liquid phase even at 2000° C.

TABLE II

| | Chemical Composition (weight %) | | | |
|---|---|---|---|---|
| | (a) | (b) | (c) | (d) |
| CaO | 35.6 | 11.9 | 27.1 | 9.1 |
| MgO | 25.6 | 75.0 | 25.6 | 75.0 |
| $ZrO_2$ | 26.1 | 8.8 | 43.4 | 14.6 |
| $SiO_2$ | 12.7 | 4.3 | 3.9 | 1.3 |
| Mineralogical constitution in solid state (weight %) | | | | |
| Periclase | 25.6 | 75.0 | 25.6 | 75.0 |
| Calcium zirconate | 38.0 | 12.8 | 63.2 | 21.2 |
| Dicalcium silicate | 36.4 | 12.2 | 11.2 | 3.8 |
| Ratio $\frac{CaO \cdot ZrO_2}{2CaO \cdot SiO_2}$ | 1.04 | 1.04 | 5.6 | 5.6 |
| Raw material batch formulation (weight %) | | | | |
| Calcined dolomite | 75.1 | 33.1 | 62.4 | 26.2 |
| Zircon | 24.9 | 11.0 | 8.3 | 3.5 |
| Calcined magnesite | — | 55.9 | 4.3 | 59.9 |
| Zirconia | — | — | 24.9 | 10.4 |
| Temperature of initial melting (°C) | 1740±10 | 1740±10 | 1740±10 | 1740±10 |
| Temperature of Solution of $CaO.ZrO_2$ (°C) | 1925±10 | 1925±10 | 2030±25 | 2030±25 |
| Temperature of Complete melting (°C) | 2250±50 | 2670* | 2350* | 2700* |

*estimated

TABLE III

Variation in degree of solid-solid bonding in mixtures of constant liquid content at 1700° C

| Composition of mixture (Wt. %) | | | | Phases present (Wt. %) | | | $N_{ss}/N$ |
|---|---|---|---|---|---|---|---|
| MgO | CaO | $ZrO_2$ | $SiO_2$ | Periclase | Calcium zirconate | Liquid | |
| 88.8 | 5.4 | — | 5.8 | 85 | 0 | 15 | 0.135 |
| 83.8 | 7.0 | 3.4 | 5.8 | 85 | 0 | 15 | 0.17 |
| 78.8 | 8.5 | 6.9 | 5.8 | 81.5 | 3.5 | 15 | 0.275 |
| 73.8 | 10.1 | 10.3 | 5.8 | 76.5 | 8.5 | 15 | 0.315 |
| 68.8 | 11.7 | 13.7 | 5.8 | 71.5 | 13.5 | 15 | 0.325 |
| 63.8 | 13.2 | 17.2 | 5.8 | 66.5 | 18.5 | 15 | 0.325 |

To show the effect of the invention on hot strength, the following is a comparison of a magnesite in accordance with the invention and a magnesite of conventional characteristics:

| | Conventional Magnesite | Magnesite in accordance with the invention |
|---|---|---|
| MgO % by weight | 98.5 | 94.32 |
| CaO % by weight | 1.3 | 2.5 |
| $ZrO_2$ % by weight | Nil | 3.0 |
| $SiO_2$ % by weight | 0.2 | 0.18 |
| Modulus of Rupture | | |
| 1400° C | 513 | 1576 |
| 1500° C | 463 | 1242 |
| 1600° C | 313 | 1839 |
| 1700° C | 120 | 1123 |

Thus, basic refractories of improved performance can be produced by blending suitable raw materials containing CaO, MgO, $ZrO_2$ and $SiO_2$ in such proportions that (i) when reaction between the constituents has proceeded to completion they will contain periclase and calcium zirconate when solid, and (ii) such that those two solid phases will coexist with the liquid phase at temperatures above those at which melting begins.

The first condition is satisfied by compositions, which, when fully reacted, will give phase combinations (5) to (11) inclusive in the solid state. Where maximum refractoriness is required, compositions giving phase combinations (8), (9), (10), or (11) will normally be preferred. Compositions lying outside this range, which will, when reacted, contain limited amounts of monticellite or merwinite, or both, are however not excluded, since the presence of these low-melting compounds will enable firing to be carried out at lower temperatures and may be advantageous in certain circumstances. Similarly, compositions containing free lime are not excluded since they may be suitable for certain applications where hydration does not constitute a problem.

While condition (ii) is satisfied over a wide range of magnesia contents, compositions having total silicate contents below 10% and periclase contents above 80% in the solid state when fully reacted will generally be preferred except in the case of mixtures giving solid lime within the melting range, where proportionately lower magnesia contents are acceptable. In mixtures where dusting of dicalcium silicate is encountered during cooling, stabilizing additions may be added. Such stabilisers include $Cr_2O_3$, $B_2O_3$ and $P_2O_5$.

According to a further feature of the invention, a method for the manufacture of solid-solid bonded basic refractories, a solid-solid bond of which is produced by the zirconate of an alkaline-earth metal, comprises reducing the refractory material to a suitable particle size and size distribution, pelletizing the crushed and graded batch and firing in a suitable kiln. To facilitate the production of a high density clinker, the materials or the mixture of the materials with zircon or with zircon and zirconia, may be pre-calcined before pelletizing. The clinker is then crushed to a suitable particle size for the manufacture of refractory bricks or for use in ramming mixtures or refractory concretes. An alternative method of preparation would be by fusion and casting.

What is claimed is:

1. A solid-solid bonded basic refractory having a chemical composition (calculated as the oxides) consisting essentially of MgO in the amount 25% to 97% by weight; CaO 0.9% to 44% by weight; $ZrO_2$ 2% to 57% by weight; and $SiO_2$ 0.5% to 23.5% by weight; the said basic refractory containing a silicate and an alkaline earth metal zirconate, the $CaO/SiO_2$ ratio being greater than 1.4, there being at least one part by weight of said alkaline earth metal zirconate for each three parts by weight of said silicate, and the CaO to $SiO_2 + ZrO_2$ ratio being between 0.32 and 1.40, said alkaline earth metal zirconate being capable of co-existing with any basic solid refractory phase at a temperature of at least 1700° C. in which solid-solid bonding is maintained between said zirconate and said solid refractory phase in the presence of a liquid phase at a temperature of at least 1700° C. and in which said refractory forms a skeleton of said zirconate bonded to said refractory phase at a temperature of at least 1700° C.

2. A solid-solid bonded basic refractory as in claim 1, wherein said zirconate of an alkaline-earth metal initially exists as an alkaline-earth metal zirconate.

3. A solid-solid bonded basic refractory as in claim 2, wherein the zirconate is calcium zirconate.

4. A solid-solid bonded basic refractory as in claim 1, wherein said alkaline-earth metal zirconate is the product of the reaction of zirconia or zirconia containing compounds with a compound containing an alkaline-earth metal on firing of the refractory.

5. A solid-solid bonded basic refractory as in claim 4, wherein said alkaline-earth metal zirconate is the product of the reaction of lime or lime-containing compounds and zirconia or zirconia-containing compounds on firing to form calcium zirconate for formation of the zirconate bond.

6. A solid-solid bonded basic refractory as in claim 5, wherein the lime is raw or burnt dolomite and the zirconia is zircon.

7. A solid-solid bonded basic refractory having an initial composition MgO 60 to 85% by weight, CaO 7 to 14% by weight, $ZrO_2$ 6 to 18% by weight, $SiO_2$ 0.5% to 6% by weight, the refractory at temperatures in excess of 1700° C. having calcium zirconate, 3 to 19% by weight, and 15% by weight of a liquid phase, the refractory at 1700° C. having a degree of solid-solid bonding represented by an Nss/N factor in excess of 0.17%, where Nss is the total points of contact between the solid phases and N the total points of contact between the solid phases plus the points of contact between the solid phases and the liquid phase.

8. A solid-solid bonded basic refractory having an initial composition MgO 94.32% by weight, CaO 2.5% by weight, $ZrO_2$ 3.0% by weight, $SiO_2$ 0.18% by weight, the refractory exhibiting a modulus of rupture in excess of 1100 p.s.i. at 1700° C.

* * * * *